Patented May 20, 1952

2,597,723

UNITED STATES PATENT OFFICE 2,597,723

EQUILIN-3-MONOSULFATE AND ALKALINE SALTS THEREOF

Gordon A. Grant, Montreal, Quebec, and William L. Glen, Baie d'Urfe, Quebec, Canada, assignors to Ayerst, McKenna & Harrison, Limited, St. Laurent, Quebec, Canada, a corporation of Canada No Drawing. Application July 16, 1948, Serial No. 39,198

8 Claims. (Cl. 260—239.5)

This invention relates to new hormone derivatives and to their preparation. More particularly it relates to the preparation of equilin sulphate and its salts.

The applicants have found that when the compound equilin is treated with a sulphating agent, a hitherto unknown compound is obtained, the 3-monosulphate of equilin. This compound is water-soluble and possesses a surprisingly higher degree of oral oestrogenic activity than the free oestrogen, when the two products are assayed by oral administration to adult ovariectomised rats. Equilin monosulphate may be used in the form of its inorganic and organic salts.

The synthesis is preferably carried out as follows. Equilin in solution in a dry organic solvent, for example, a mixture of dry pyridine and dry chloroform is reacted with a suitable sulphating reagent, for example, chlorosulphonic acid in a dry chloroform and pyridine mixture.

The reaction mixture is allowed to stand for several hours to allow the reaction to proceed to completion, and the solvents then removed by evaporation under reduced pressure. The product contains the desired equilin-3-monosulphate, probably as the pyridine salt.

For preparation of the sodium salt the above product is washed with ether, and the ether insoluble material dissolved in methanol and neutralized with 1 N methanolic sodium hydroxide solution. After centrifugation, sodium equilin 3-mono-sulphate is obtained from the clear supernatant by precipitation with an excess of ether. The sodium equilin 3-monosulphate is obtained as a white powder which in contradistinction to the original equilin, is freely soluble in water.

The sodium salt of the new compound analyses for $C_{18}H_{19}O_5NaS$ and can probably be represented by the following structural formula:

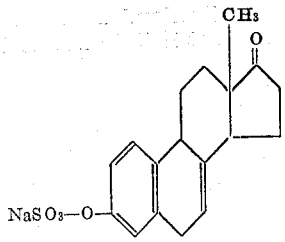

It should, however, be stated that this formula is given merely as a temporary assumption and may later be shown to require modifications.

Other inorganic salts can be prepared using the appropriate metal ion hydroxide, for example, potassium, calcium, barium, lithium or ammonium. In addition to the pyridine salt, other organic salts can be prepared using organic bases (for example quinoline, picoline, piperidine) as the neutralising agents. Salts of alkaloidal bases can also be prepared, for example the quinidine salt can be obtained as a precipitate from aqueous solutions of sodium equilin sulphate upon the addition of a solution of a water-soluble quinidine salt, for example, quinidine sulphate.

It is understood that in synthesis of the new derivative, other sulphating agents, for example, pyridine sulphur trioxide, can be employed without departing from the spirit of the invention.

EXAMPLES

The following examples illustrate the invention in detail but it is to be understood that the examples are merely illustrative and not to be considered limitative either of the particular reactants indicated, or of the particular conditions described. As will be obvious to those skilled in the art, equivalent substances may be used in place of those mentioned and the reaction conditions may be varied to an appreciable extent.

Example 1

0.16 cc. of chlorosulphonic acid was dissolved in dry chloroform and 5.0 cc. of pyridine was added slowly. The mixture was thoroughly chilled and treated with a solution of 570 mgm. of equilin in 10 cc. of pyridine and 20 cc. of chloroform. The reaction mixture was left for 24 hours at room temperature in a stoppered flask, and then evaporated under reduced pressure. The residue was agitated with 50 cc. of ether, then chilled and the ether decanted. This ether washing was repeated and the ether-insoluble residue dissolved in methanol and neutralised with 1 N methanolic sodium hydroxide solution. After centrifugation the clear supernatant was separated and precipitated by the addition of an excess of ether. The precipitated sodium equilin sulphate was filtered off, and dried in vacuo. It was purified by solution in methyl alcohol, treatment with a little activated carbon, filtration, and reprecipitation of the decolorised supernatant solution with an excess of ether.

The product was a hygroscopic, water-soluble white powder which melts indefinitely ca 187–192° C. When assayed by oral administration to ovariectomized adult rats it was approximately twice as active as was free equilin itself (R. D. 50% sodium equilin sulphate, about 100–120γ. R. D. 50% equilin, for about 200–210γ.

Calculated for $C_{18}H_{19}O_5SNa$, C, 58.30; H, 5.12; S, 8.64. Found: C, 58.20; H, 5.10; S, 8.40.

One such sample gave: $a_D: +217°$ (in water).

Equilin content (as determined by the Marrian-Kober test) is about 76%, theory for $C_{18}H_{19}O_5SNa$ requires 72%.

Example II 570 mgm. of equilin was treated with chlorosulphonic acid as described in Example I and the resulting product neutralized with methanolic 1 N potassium hydroxide solution in place of sodium hydroxide.

After centrifugation, the clear supernatant was precipitated by the addition of excess of ether. The precipitated potassium equilin sulphate was filtered off, and dried in vacuo. It was purified by solution in methyl alcohol, followed by treatment with a little activated carbon, and the filtered decolorised supernatant solution precipitated with an excess of ether. The product was obtained as a white water-soluble powder.

$C_{18}H_{19}O_5$ S K. $3H_2O$ requires S=7.31%. Found, S=7.53%; 7.00%.

One such sample gave $a_D = +208°$ (in water).

Equilin content (as determined by the Marrian-Kober test) about 62%, theory for $C_{18}H_{19}O_5S$ K. $3H_2O$ requires 60.5%.

Example III 0.1 gm. of sodium equilin sulphate was dissolved in 20 cc. of distilled water and a filtered solution of 0.125 gm. of quinidine sulphate in 20 cc. of water added. The precipitate was filtered off, washed with water, and dried in vacuo. The quinidine equilin sulphate so obtained was a white amorphous powder.

$C_{38}H_{44}O_7N_2S$ requires N=4.16%. Found, N=4.03%; 3.90%.

One such sample gave $a_D = +247°$ (in methanol).

Equilin content (as determined by the Marrian-Kober test) about 45%, theory for $C_{38}H_{44}O_7N_2S$ requires 45%.

Example IV 0.563 gm. of quinidine equilin sulphate is suspended in 40 cc. of ether and shaken with 0.038 gm. of sulphuric acid. After filtration, and cautious evaporation of the filtrate, the unstable free ester of equilin sulphate was obtained as a cream colored powder.

Example V

To an aqueous solution of sodium equilin sulphate is added an aqueous solution of barium chloride and the resulting precipitate filtered off, washed with water and dried. The product was equilin barium sulphate as a white amorphous solid salt.

Example VI

A solution of calcium chloride in water was added to a concentrated aqueous solution of sodium equilin sulphate and a resulting precipitate filtered off and dried. The product was calcium equilin sulphate as a white amorphous solid.

It will be noted from the above examples that the salts formed are those produced by the interaction of an acidic material, that is, equilin-3-monosulphate, with an organic or inorganic base.

As used in the claims, the term "alkaline salt" is intended to mean a product such as will be formed by the neutralization of equilin-3-monosulphate, with an organic or inorganic base and is not intended to be restricted to compounds having a basic reaction.

We claim:

1. A new compound selected from the group consisting of equilin-3-monosulphate and the alkaline salts thereof.

2. An alkaline salt of equilin-3-monosulphate.

3. As a new compound equilin-3-monosulphate.

4. As a new compound sodium equilin-3-monosulphate.

5. As a new compound quinidine equilin-3-monosulphate.

6. As a new compound potassium equilin-3-monosulphate.

7. A process for making an equilin sulphate, comprising subjecting equilin to the action of a sulphating agent in the presence of an inert solvent at low temperature to prevent hydrolysis thereby to convert the free hydroxyl group into the corresponding sulphate, removing the solvent by evaporation under reduced pressure, and after neutralisation, separating the equilin sulphate in the form of an alkaline salt.

8. A process for making sodium equilin sulphate comprising reacting equilin in solution in dry pyridine and chloroform, with chlorosulphonic acid, under conditions to avoid hydrolysis evaporating the solvent under relatively low temperature conditions, solubilizing the residue in alcohol, neutralizing the alcoholic solution with alcoholic sodium hydroxide, separating the liquid fraction and finally adding ether to obtain precipitated sodium equilin sulphate.

GORDON A. GRANT.
WILLIAM L. GLEN.

REFERENCES CITED

The following references are of record in the file of this patent:

UNITED STATES PATENTS

| Number | Name | Date |
|---|---|---|
| 2,005,700 | Johannessohn et al. | June 18, 1935 |
| 2,047,307 | Butenandt | July 14, 1936 |
| 2,228,397 | Miescher et al. | Jan. 14, 1941 |
| 2,305,727 | Miescher et al. | Dec. 22, 1942 |

FOREIGN PATENTS

| Number | Country | Date |
|---|---|---|
| 177,414 | Switzerland | Oct. 1, 1935 |
| 499,794 | Great Britain | Jan. 30, 1939 |